(12) United States Patent
Nishidai et al.

(10) Patent No.: US 9,035,757 B2
(45) Date of Patent: May 19, 2015

(54) COMMUNICATION SYSTEM AND COMMUNICATION DEVICE

(71) Applicants: Tetsuo Nishidai, Aichi (JP); Kazunobu Kamisawa, Aichi (JP); Yosuke Tomita, Aichi (JP)

(72) Inventors: Tetsuo Nishidai, Aichi (JP); Kazunobu Kamisawa, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/156,925

(22) Filed: Jan. 16, 2014

(65) Prior Publication Data
US 2014/0207313 A1    Jul. 24, 2014

(30) Foreign Application Priority Data

Jan. 18, 2013    (JP) .................................. 2013-006873

(51) Int. Cl.
*H04L 27/00* (2006.01)
*B60R 25/00* (2013.01)
(Continued)

(52) U.S. Cl.
CPC .............. *B60R 25/00* (2013.01); *H04L 27/0008* (2013.01); *H04L 1/00* (2013.01); *H04L 1/206* (2013.01); *H04W 4/008* (2013.01); *H04W 12/08* (2013.01);
(Continued)

(58) Field of Classification Search
CPC .............. H03C 1/00; H03C 5/00; H03C 3/00; G07C 5/008; B60R 25/24; H04L 27/00
USPC .............. 701/2, 36, 45, 49; 340/425.5, 426.1, 340/426.13, 426.16, 426.17, 426.18, 340/426.28, 426.35, 426.36, 438, 5.3, 5.61, 340/12.11; 375/271–275, 279, 295, 375/300–316, 322–352; 713/168
See application file for complete search history.

(56) References Cited

U.S. PATENT DOCUMENTS 6,803,851 B1 * 10/2004 Kramer et al. ................ 340/5.61
7,102,498 B2 * 9/2006 Desai et al. .................... 340/447
(Continued)

FOREIGN PATENT DOCUMENTS

JP    2006-161507 A    6/2006
JP    2011-021369 A    2/2011
(Continued)

OTHER PUBLICATIONS

Office Action issued in corresponding Japanese Application No. 2013-006873, mailed Dec. 5, 2014 (6 pages).

*Primary Examiner* — Thomas Tarcza
*Assistant Examiner* — Tyler J Lee
(74) *Attorney, Agent, or Firm* — Osha Liang LLP

(57) ABSTRACT

A communication system has a first communication device, and a second communication device that conducts wireless communication the first communication device. The first communication device has a first transmitter that transmits a signal to the second communication device while modulating the signal, and a first transmission controller that controls the first transmitter. The second communication device has a first receiver that receives the signal from the first communication device and demodulates the received signal. The first transmission controller performs control so as to change a modulation method in midstream when a predetermined first signal is modulated and transmitted. The first receiver changes a demodulation method according to the change of the modulation method of the first signal in midstream when the first signal is received and demodulated.

14 Claims, 13 Drawing Sheets

(51) Int. Cl.
*H04W 4/00* (2009.01)
*H04W 12/08* (2009.01)
*H04L 29/06* (2006.01)
*H04W 12/06* (2009.01)
*H04L 1/00* (2006.01)
*H04L 1/20* (2006.01)

(52) U.S. Cl.
CPC ........... *H04L 63/1441* (2013.01); *H04W 12/06* (2013.01)

(56) References Cited

U.S. PATENT DOCUMENTS

| | | | |
|---|---|---|---|
| 7,394,869 B2* | 7/2008 | Jensen et al. | 375/302 |
| 7,859,389 B2* | 12/2010 | Baumgartner et al. | 340/426.36 |
| 8,587,403 B2* | 11/2013 | Ghabra et al. | 340/5.61 |
| 2005/0013389 A1* | 1/2005 | Mizukami | 375/323 |
| 2005/0220218 A1* | 10/2005 | Jensen et al. | 375/302 |
| 2006/0267744 A1* | 11/2006 | Baumgartner et al. | 340/426.36 |
| 2008/0136590 A1* | 6/2008 | Baumgartner et al. | 340/5.72 |
| 2008/0165900 A1* | 7/2008 | Vassilieva | 375/329 |
| 2008/0170639 A1* | 7/2008 | Vassilieva et al. | 375/300 |
| 2012/0236957 A1 | 9/2012 | Tomita et al. | |

FOREIGN PATENT DOCUMENTS

| | | |
|---|---|---|
| JP | 2011-052412 A | 3/2011 |
| JP | 2012-209924 A | 10/2012 |

\* cited by examiner

COMMUNICATION SYSTEM AND COMMUNICATION DEVICE

BACKGROUND OF THE INVENTION

1. Technical Field

The present invention relates to a communication system and a communication device, particularly to a communication system and a communication device, in which relay attack is difficult to perform.

2. Related Art

Nowadays, an electronic key system is becoming popular. The electronic key system includes a function (hereinafter referred to as an automatic entry function) in which a door of a vehicle can be locked and unlocked without using a mechanical key or without operating a portable key by conducting wireless communication between an in-vehicle communication device provided in the vehicle and the portable key possessed by a user.

The automatic entry function is roughly divided into the following two kinds of methods. In the first method, the door of the vehicle is automatically locked and unlocked when a user who possesses the portable key performs a predetermined operation (such that the user touches the door or such that the user operates a button provided in the door). For example, when the user performs the predetermined operation to the vehicle, an authentication request signal is transmitted from the in-vehicle communication device to a predetermined area, the portable key that receives the authentication request signal transmits a response signal including the authentication information, and the door is locked or unlocked when the authentication is successfully performed.

In the second method, the door is automatically unlocked when the user who possesses the portable key comes close to the vehicle, and the door is automatically locked when the user moves away from the vehicle. For example, the authentication request signal is periodically transmitted from the in-vehicle communication device to the predetermined area, the portable key that receives the authentication request signal transmits the response signal including the authentication information, the door is locked or unlocked when the authentication is successfully performed, and the door is locked when the response signal cannot be received.

The vehicle including the automatic entry function has a risk of a theft or an intrusion by a technique called a relay attack. As used herein, the relay attack is a technique in which, although the user who possesses the portable key is outside a communication area of the in-vehicle communication device, a malicious third party enables the communication between the in-vehicle communication device and the portable key to be conducted using a repeater, and performs such a fraud that the door of the vehicle is unlocked.

Conventionally, for example, Japanese Unexamined Patent Publication No. 2011-52412 has proposed that a request signal is transmitted twice from the in-vehicle communication device to the portable key as a countermeasure against the relay attack. In Japanese Unexamined Patent Publication No. 2011-52412, the portable key makes a notification of a reply mode for a second-time request signal when replying to a first-time request signal, and the portable key replies in the notified reply mode in response to the second-time request signal. Therefore, although time required to complete the authentication is lengthened because the request signal is transmitted twice, the relay attack is difficult to perform because it is difficult for the repeater to recognize the reply mode and perform switching.

For example, Japanese Unexamined Patent Publication No. 2012-209924 has proposed that, in addition to the countermeasure against the relay attack, the portable key transmits a signal having an identical content a plurality of times while FSK-modulating the signal by different maximum frequency shifts, thereby preventing interference such as disturbance of the wireless communication between the portable key and the in-vehicle communication device.

SUMMARY

In one or more embodiments of the present invention, a relay attack is difficult to perform.

In accordance with one or more embodiments of the present invention, a communication system in which a first communication device and a second communication device conduct wireless communication with each other. In the communication system, the first communication device includes: a first transmitter that transmits a signal to the second communication device while modulating the signal; and a first transmission controller that controls the first transmitter, the second communication device includes a first receiver that receives the signal from the first communication device and demodulates the received signal, the first transmission controller performs control so as to change a modulation method in midstream when a predetermined first signal is modulated and transmitted, and the first receiver changes a demodulation method according to the change of the modulation method of the first signal in midstream when the first signal is received and demodulated.

In one or more embodiments of the present invention, the modulation method is changed in midstream when the first communication device transmits the predetermined first signal while modulating the first signal, and the demodulation method is changed according to the change of the modulation method of the first signal in midstream when the second communication device receives and demodulates the first signal.

Accordingly, the relay attack is difficult to perform.

For example, one of the first communication device and the second communication device is constructed by a vehicle key fob, and the other is constructed by an in-vehicle communication device. For example, the first transmitter is constructed by various transmitting circuits or a dedicated IC. For example, the first transmission controller is constructed by a microcomputer including a processor such as a CPU, or an ECU. For example, the first receiver is constructed by various receiving circuits or a dedicated IC.

The first communication device may further include a second receiver that receives a signal from the second communication device and demodulates the received signal, the second communication device may be provided in a vehicle, the second communication device may further include: a second transmitter that transmits the signal to the first communication device while modulating the signal; a second transmission controller that controls the second transmitter; and a vehicle controller that controls processing of the vehicle, the second transmission controller may perform control such that a predetermined second signal is transmitted when a predetermined operation is performed to the vehicle, or such that the second signal is periodically transmitted, the first transmission controller may perform control such that the first signal is transmitted in response to the second signal, and the vehicle controller may issue a command to perform predetermined processing of the vehicle when the normal first signal is received from the first communication device.

Therefore, for example, the relay attack is difficult to perform in the vehicle including the automatic entry function.

For example, the second receiver is constructed by various receiving circuits or a dedicated IC. For example, the second transmitter is constructed by various transmitting circuits or a dedicated IC. For example, the second transmission controller is constructed by a microcomputer including a processor such as a CPU, or an ECU. For example, the vehicle controller is constructed by a microcomputer including a processor such as a CPU, or an ECU.

The first communication device may be provided in the vehicle, the first communication device may further include: a second receiver that receives the signal from the second communication device and demodulates the received signal; and a vehicle controller that controls processing of the vehicle, the second communication device may further include: a second transmitter that transmits the signal to the first communication device while modulating the signal; and a second transmission controller that controls the second transmitter, the first transmission controller may perform control such that the first signal is transmitted when a predetermined operation is performed to the vehicle, or such that the first signal is periodically transmitted, the second transmission controller may perform control such that the second signal is transmitted in response to the first signal, and the vehicle controller may issue a command to perform predetermined processing of the vehicle when the normal second signal is received from the second communication device.

Therefore, for example, the relay attack is difficult to perform in the vehicle including the automatic entry function.

For example, the second receiver is constructed by various receiving circuits or a dedicated IC. For example, the vehicle controller is constructed by a microcomputer including a processor such as a CPU, or an ECU. For example, the second transmitter is constructed by various transmitting circuits or a dedicated IC. For example, the second transmission controller is constructed by a microcomputer including a processor such as a CPU, or an ECU.

The first transmission controller may perform control such that the first signal is transmitted while divided into at least a first division signal and a second division signal.

The first transmission controller may perform control such that the first division signal is modulated by a predetermined first modulation method and such that the second division signal is modulated by a predetermined second modulation method different from the first modulation method, and the first receiver may demodulate the first division signal by a first demodulation method corresponding to the first modulation method and demodulate the second division signal by a second demodulation method corresponding to the second modulation method.

Therefore, the switching between the modulation method and the demodulation method can surely be synchronized.

The first transmission controller may perform control such that a change position of the modulation method of the second division signal is set, such that the second communication device is notified of the set change position using the first division signal, and such that the modulation method is changed in the change position of the second division signal, and the first receiver may change the demodulation method of the second signal in the change position of which the second communication device is notified using the first division signal.

Therefore, the relay attack may be difficult to perform.

The first transmission controller may perform control such that a second modulation method different from a predetermined first modulation method is selected from a plurality of modulation methods, such that the second communication device is notified of the selected second modulation method using the first division signal, such that the first division signal is modulated by the first modulation method, and such that the second division signal is modulated by the second modulation method, and the first receiver may demodulate the first division signal by a first demodulation method corresponding to the first modulation method and demodulate the second division signal by a second demodulation method corresponding to the second modulation method of which the second communication device is notified using the first division signal.

Therefore, the relay attack may be difficult to perform.

The first transmission controller may perform control such that the modulation method is changed in a previously-set predetermined position of the first signal, and the first receiver may change the demodulation method in the previously-set predetermined position of the first signal.

Therefore, the relay attack may be difficult to perform.

In accordance with one or more embodiments of the present invention, a communication device that conducts wireless communication with another communication device, the communication device includes: a transmitter that transmits a signal to the other communication device while modulating the signal; and a transmission controller that controls the transmitter. In the communication device, the transmission controller performs control such that a modulation method is changed in midstream when a predetermined signal is transmitted while modulated.

In one or more embodiments of the present invention, the modulation method is changed in midstream, when the predetermined signal is transmitted while modulated.

Accordingly, the relay attack may be difficult to perform.

For example, one of the communication device and the other communication device is constructed by a vehicle key fob, and the other is constructed by an in-vehicle communication device. For example, the transmitter is constructed by various transmitting circuits or a dedicated IC. For example, the transmission controller is constructed by a microcomputer including a processor such as a CPU, or an ECU.

In accordance with one or more embodiments of the present invention, a communication device that conducts wireless communication with another communication device, the communication device includes a receiver that receives a signal from the communication device and demodulates the received signal. In the communication device, the receiver changes a demodulation method according to a change of a modulation method of a predetermined signal when receiving the predetermined signal from the other communication device to demodulate the predetermined signal.

In one or more embodiments of the present invention, the demodulation method is changed according to the change of the modulation method of the predetermined signal in midstream when the predetermined signal is received and demodulated.

Accordingly, the relay attack may be difficult to perform.

For example, one of the communication device and the other communication device is constructed by a vehicle key fob, and the other is constructed by an in-vehicle communication device. For example, the receiver is constructed by various receiving circuits or a dedicated IC.

According to one or more embodiments of the present invention, the relay attack may be difficult to perform.

DETAILED DESCRIPTION

Hereinafter, embodiments of the present invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The description is made in the following order.
1. Embodiments
2. Modifications 1. Embodiments Configuration Example of Communication System 101

Figure 1:
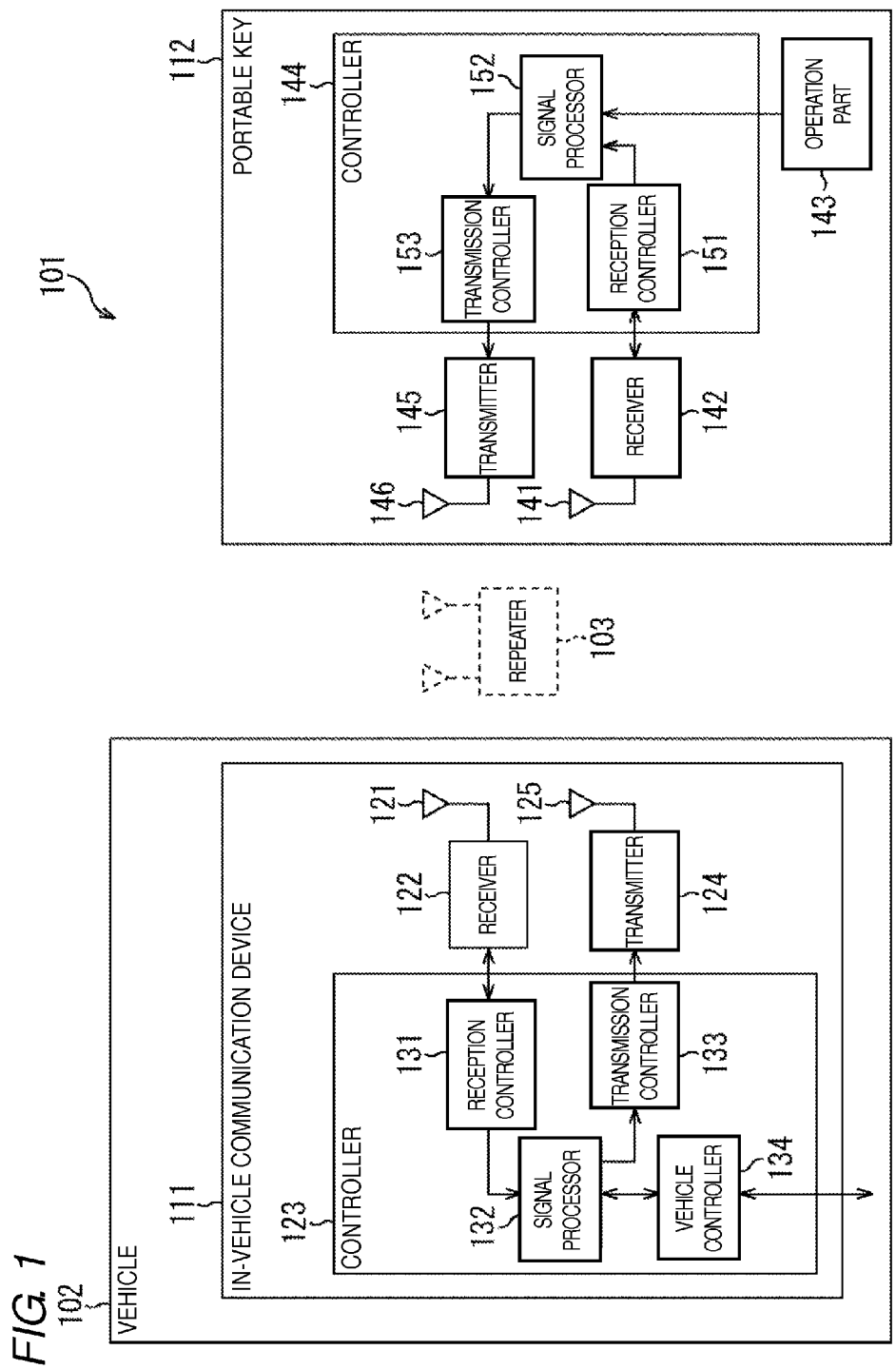
FIG. 1 is a block diagram illustrating a communication system according to one or more embodiments of the present invention.

FIG. 1 is a block diagram illustrating a communication system 101 according to one or more embodiments of the present invention. The communication system 101 is used to implement a predetermined function of a vehicle 102. As used herein, for example, the predetermined function means a function of locking and unlocking a door of the vehicle 102 (automatic entry function) without using a mechanical key or operating a portable key 112, a function of starting up a driving machine such as an engine and a motor only by operating a button of the vehicle 102 (hereinafter referred to as a push start function) or a function of lighting a welcome lamp (hereinafter referred to as a welcome lamp lighting function). The welcome lamp is provided in a car or near a door mirror in order to check a situation of the vehicle 102 or a surrounding area in the dark.

As described later, in the communication system 101, a measure is taken to prevent a relay attack in which a repeater 103 is used.

The communication system 101 includes an in-vehicle communication device 111 provided in the vehicle 102 and the portable key 112 possessed by a user. The in-vehicle communication device 111 and the portable key 112 conduct bidirectional wireless communication with each other.

The in-vehicle communication device 111 includes an antenna 121, a receiver 122, a controller 123, a transmitter 124, and an antenna 125.

For example, the receiver 122 is constructed by various receiving circuits or a dedicated IC. Under control of a reception controller 131 of the controller 123, the receiver 122 receives a UHF-band signal (hereinafter referred to as an RF signal) from the portable key 112 through the antenna 121, and demodulates the received RF signal. The receiver 122 can demodulate signals of a plurality of kinds of modulation methods, and changes the demodulation method of the RF signal under the control of the reception controller 131. The receiver 122 supplies to the reception controller 131 a baseband signal obtained by the demodulation of the RF signal.

For example, an ASK (Amplitude Shift Keying) demodulation method, an FSK (Frequency Shift Keying) demodulation method, and a PSK (Phase Shift Keying) demodulation method can be adopted as the demodulation method of the receiver 122.

For example, the controller 123 is constructed by a microcomputer including a processor such as a CPU (Central Processing Unit) or an ECU (Electronic Control Unit). The controller 123 includes the reception controller 131, a signal processor 132, a transmission controller 133, and a vehicle controller 134.

The reception controller 131 controls the receiver 122. The reception controller 131 supplies to the signal processor 132 the baseband signal supplied from the receiver 122.

The signal processor 132 performs various pieces of signal processing (for example, a signal analysis and processing based on an analysis result) to the baseband signal supplied from the reception controller 131. As needed basis, the signal processor 132 notifies the reception controller 131, the transmission controller 133, and the vehicle controller 134 of a result of the signal processing. Based on the result of the signal processing or a command from the vehicle controller 134, the signal processor 132 generates the signal (baseband signal) to be transmitted to the portable key 112, and supplies the generated signal to the transmission controller 133.

The transmission controller 133 supplies to the transmitter 124 the baseband signal supplied from the signal processor 132. The transmission controller 133 controls the transmitter 124.

The vehicle controller 134 conducts communication with another device (for example, the ECU), which is provided in the vehicle 102, in order to transmit and receive various pieces of information or to provide or receive a command.

For example, the transmitter 124 is constructed by various transmitting circuits or a dedicated IC. Under the control of the transmission controller 133, the transmitter 124 ASK-modulates the baseband signal supplied from the transmission controller 133 using an LF-band carrier wave. Under the control of the transmission controller 133, the transmitter 124 transmits the modulated signal (hereinafter referred to as an LF signal) to the portable key 112 through the antenna 125.

For example, the portable key 112 is constructed by a key fob possessed by the user who uses the vehicle 102. The portable key 112 includes an antenna 141, a receiver 142, an operation part 143, a controller 144, a transmitter 145, and an antenna 146.

For example, receiver 142 is constructed by various receiving circuits or a dedicated IC. Under the control of a reception controller 151 of the controller 144, the receiver 142 receives the LF signal from the in-vehicle communication device 111 through the antenna 141, and demodulates the received LF signal. The receiver 122 supplies to the reception controller 151 the baseband signal obtained by the demodulation of the LF signal.

For example, the operation part 143 is constructed by a button or a switch, and operated when a predetermined operation of the vehicle 102 is performed. The operation part 143 supplies the signal indicating an operation content to a signal processor 152 of the controller 144.

For example, the controller 144 is constructed by the microcomputer including the processor such as the CPU. The controller 144 includes the reception controller 151, the signal processor 152, and a transmission controller 153.

The reception controller 151 controls the receiver 142. The reception controller 151 supplies to the signal processor 152 the baseband signal supplied from the receiver 142.

The signal processor 152 performs various pieces of signal processing (for example, the signal analysis and the processing based on the analysis result) to the baseband signal supplied from the reception controller 151. Based on the result of the signal processing or an operation signal from the operation part 143, the signal processor 152 generates the signal (baseband signal) to be transmitted to the in-vehicle communication device 111, and supplies the generated signal to the transmission controller 153.

The transmission controller 153 supplies to the transmitter 145 the baseband signal supplied from the signal processor 152. The transmission controller 153 controls the transmitter 145.

For example, the transmitter 145 is constructed by various transmitting circuits or a dedicated IC. Under the control of the transmission controller 153, the transmitter 145 modulates the baseband signal supplied from the transmission controller 153 using a UHF-band carrier wave. The transmitter 145 is compatible with the plurality of kinds of modulation methods, and changes the modulation method of the RF signal under the control of the transmission controller 153. Under the control of transmission controller 153, the transmitter 145 transmits the modulated RF signal to the in-vehicle communication device 111 through the antenna 146.

For example, an ASK modulation method, an FSK modulation method, and a PSK modulation method can be adopted as the modulation method of the transmitter 145.

First Embodiment of Processing of Communication System 101

A first embodiment of processing of the communication system 101 will be described below with reference to FIGS. 2 to 4.

Figure 2:
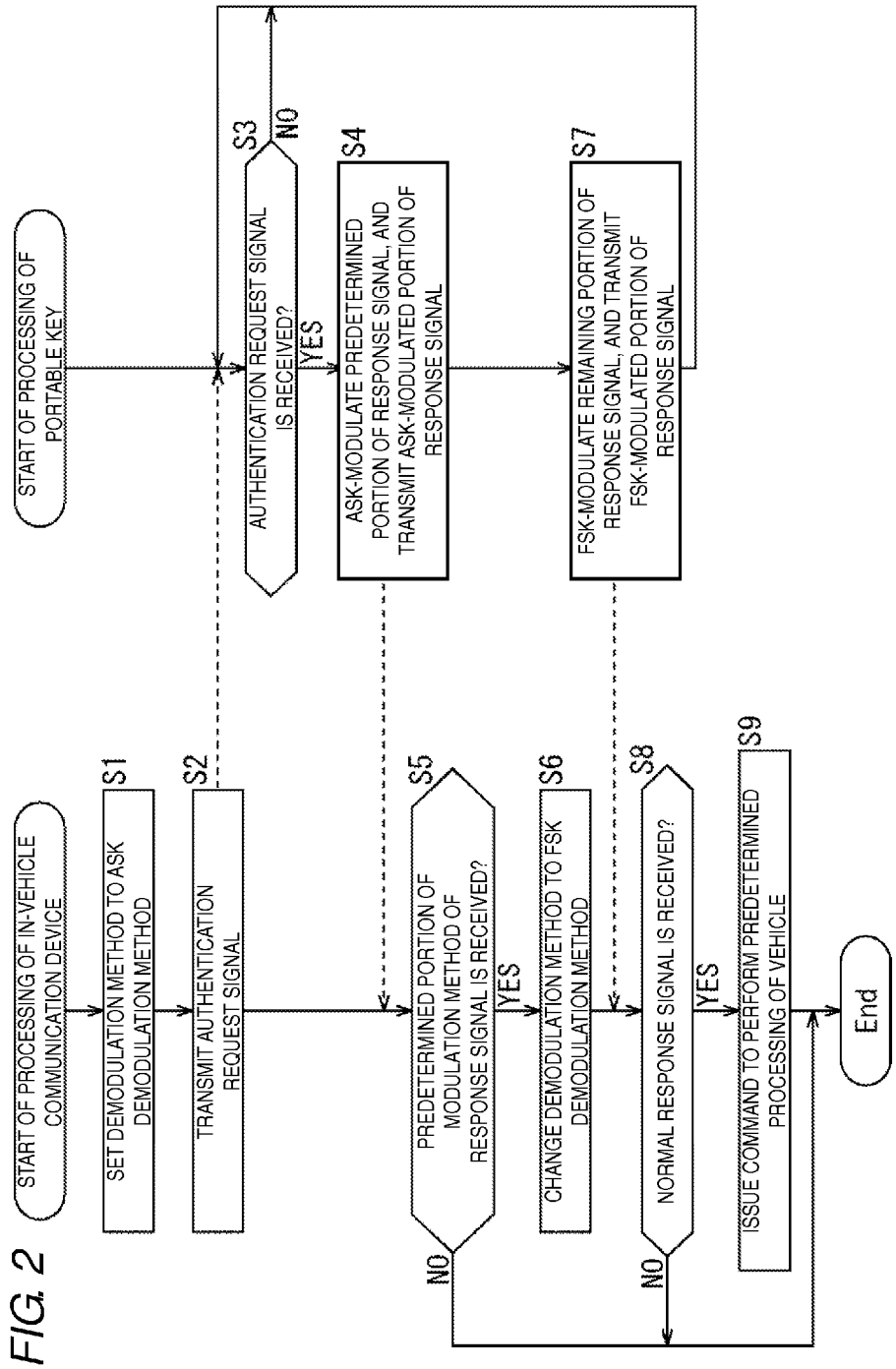
FIG. 2 is a chart illustrating a first embodiment of processing of the communication system.
Figure 3:
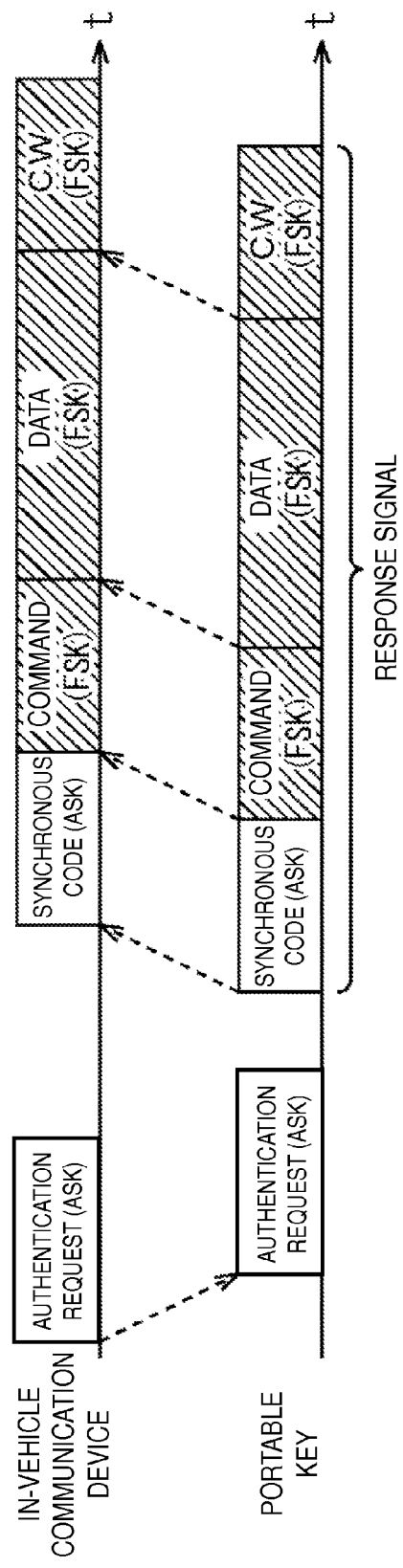
FIG. 3 is a timing chart illustrating a signal flow in the first embodiment of the processing of the communication system.

FIG. 2 is a flowchart illustrating the first embodiment of the processing of the communication system 101, and FIG. 3 is a timing chart illustrating a signal flow of the communication system 101. FIG. 4 illustrates an example of a waveform of a response signal transmitted from the in-vehicle communication device 111.

In Step S1, the reception controller 131 of the in-vehicle communication device 111 sets the demodulation method of the receiver 122 to the ASK demodulation method.

In Step S2, the in-vehicle communication device 111 transmits an authentication request signal. Specifically, the signal processor 132 generates the authentication request signal, and supplies the authentication request signal to the transmitter 124 through the transmission controller 133. The transmitter 124 ASK-modulates the authentication request signal, and transmits the modulated authentication request signal to the antenna 125.

As illustrated in a head portion of the timing chart in FIG. 3, the ASK-modulated authentication request signal is transmitted from the in-vehicle communication device 111 to the portable key 112 through the processing.

The authentication request signal may be transmitted when a predetermined operation (for example, a person touches the door of the vehicle 102 or operates the button provided in the door) is performed to the vehicle 102, or the authentication request signal may periodically be transmitted. Hereinafter, the former is referred to as a retrospective authentication system, and the latter is referred to as a prior authentication system. The processing in which the retrospective authentication system is adopted will mainly be described below.

In Step S3, the signal processor 152 of the portable key 112 determines whether the authentication request signal is received. The determination processing in Step S3 is repeatedly performed until the authentication request signal is determined to be received.

When the authentication request signal is received from the in-vehicle communication device 111 through the antenna 141 in the processing of Step S1, the receiver 142 of the portable key 112 demodulates the received authentication request signal. The receiver 142 supplies the demodulated authentication request signal to the signal processor 152 through the reception controller 151. Then, the signal processor 152 determines that the authentication request signal is received. Then the processing goes to Step S4.

In Step S4, the portable key 112 ASK-modulates a predetermined portion of data included in the response signal, and transmits the ASK-modulated portion. Specifically, the signal processor 152 generates the response signal in response to the authentication request signal received from the in-vehicle communication device 111, and supplies the response signal to the transmitter 145 through the transmission controller 153.

For example, as illustrated in FIG. 3, the response signal includes blocks of a synchronous code portion, a command portion, a data portion, and a CW (Continuous Wave) portion.

The synchronous code part is the block that includes a synchronous code having a predetermined value in order to synchronize the portable key 112 and the in-vehicle communication device 111 with each other.

The command portion is the block that includes the processing command performed by the vehicle 102.

The data portion is the block that includes the data necessary when the vehicle 102 performs the processing of the command. The data portion includes at least authentication information, such as ID, which identifies the portable key 112.

The CW portion is the block that includes a continuous wave used to measure a radio field intensity of the response signal.

In the example in FIG. 3, it is previously determined that the synchronous code portion of the response signal is ASK-modulated while other portion is FSK-modulated. The transmitter 145 ASK-modulates the synchronous code portion, and transmits the ASK-modulated synchronous code portion through the antenna 146.

The example in FIG. 3 in which the modulation method is changed in the command portion will be described below.

In Step S5, the signal processor 132 of the in-vehicle communication device 111 determines whether the predetermined portion of the response signal transmitted by the ASK modulation method is received. Specifically, when receiving the synchronous code portion of the response signal transmitted from the portable key 112 in the processing of Step S4 through the antenna 121, the receiver 122 of the in-vehicle communication device 111 demodulates the ASK-modulated synchronous code portion, and supplies the demodulated synchronous code portion to the signal processor 132 through the reception controller 131. The receiver 122 performs phase synchronization based on the synchronous code included in the synchronous code portion. When the above processing is performed within a determination time since the authentication request signal is transmitted, the signal processor 132 determines that a pre-change portion of the modulation method of the response signal is received. Then the processing goes to Step S6.

In Step S6, the reception controller 131 of the in-vehicle communication device 111 sets the demodulation method of the receiver 122 to the FSK demodulation method.

In Step S7, the portable key 112 FSK-modulates and transmits the remaining portion of the response signal. Specifically, under the control of the transmission controller 153, the transmitter 145 FSK-modulates the command portion to CW portion of the response signal, and transmits the FSK-modulated command portion to CW portion through the antenna 146 as illustrated in FIG. 3.

Figure 4:
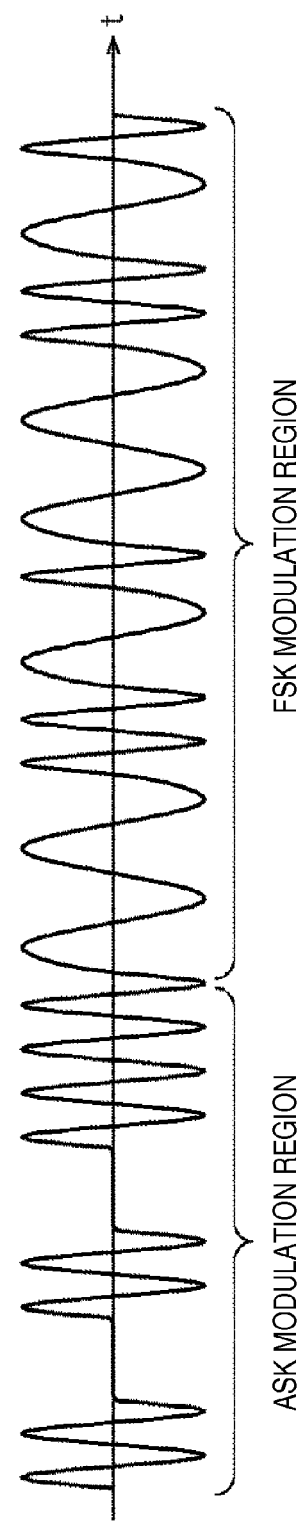
FIG. 4 is a diagram illustrating an example of a waveform of a response signal transmitted from an in-vehicle communication device.

Therefore, as illustrated in FIG. 4, the modulation method is switched from the ASK modulation method to the FSK modulation method in the middles of the response signal.

Then the processing of the portable key 112 returns to Step S3, and the pieces of processing from Step S3 are performed.

In Step S8, the signal processor 132 of the in-vehicle communication device 111 determines whether the normal response signal is received. Specifically, when receiving the command portion to CW portion of the response signal transmitted from the portable key 112 in the processing of Step S7 through the antenna 121, the receiver 122 of the in-vehicle communication device 111 demodulates the FSK-modulated command portion to CW portion, and supplies the demodulated command portion to CW portion to the signal processor 132 through the reception controller 131. The signal processor 132 collates the authentication information on the portable key 112, which is included in the data portion. When the authentication information is the normal authentication information, the signal processor 132 determines that the normal response signal is received. Then the processing goes to Step S9.

In Step S9, the vehicle controller 134 of the in-vehicle communication device 111 issues the command to perform predetermined processing of the vehicle 102. Specifically, the signal processor 132 supplies the command included in the command portion of the response signal to the vehicle controller 134. The vehicle controller 134 issues the command to another device such as the ECU in the vehicle 102 such that the processing corresponding to the acquired command is performed. Therefore, the processing such as the automatic entry function, the push start function, and the welcome lamp lighting function is performed.

Then the in-vehicle communication device 111 ends the processing.

On the other hand, when failing to receive all of or one of the command portion, the data portion, and the CW portion of the response signal in Step S8, or when failing to authenticate the response signal in Step S8, the signal processor 132 determines that the normal response signal is not received. Then the processing of the in-vehicle communication device 111 is ended.

When failing to receive the synchronous code portion of the response signal in Step S5, the signal processor 132 does not modulate the remaining portion of the response signal. Then the processing of the in-vehicle communication device 111 is ended.

For the prior authentication system, for example, when the pre-change portion of the modulation method of the response signal is determined to be not received in Step S5, when the normal response signal is determined to be not received in Step S8, or when the processing in Step S9 is ended, the processing of the in-vehicle communication device 111 returns to Step S1, and the pieces of processing from Step S1 are performed.

Figure 5:
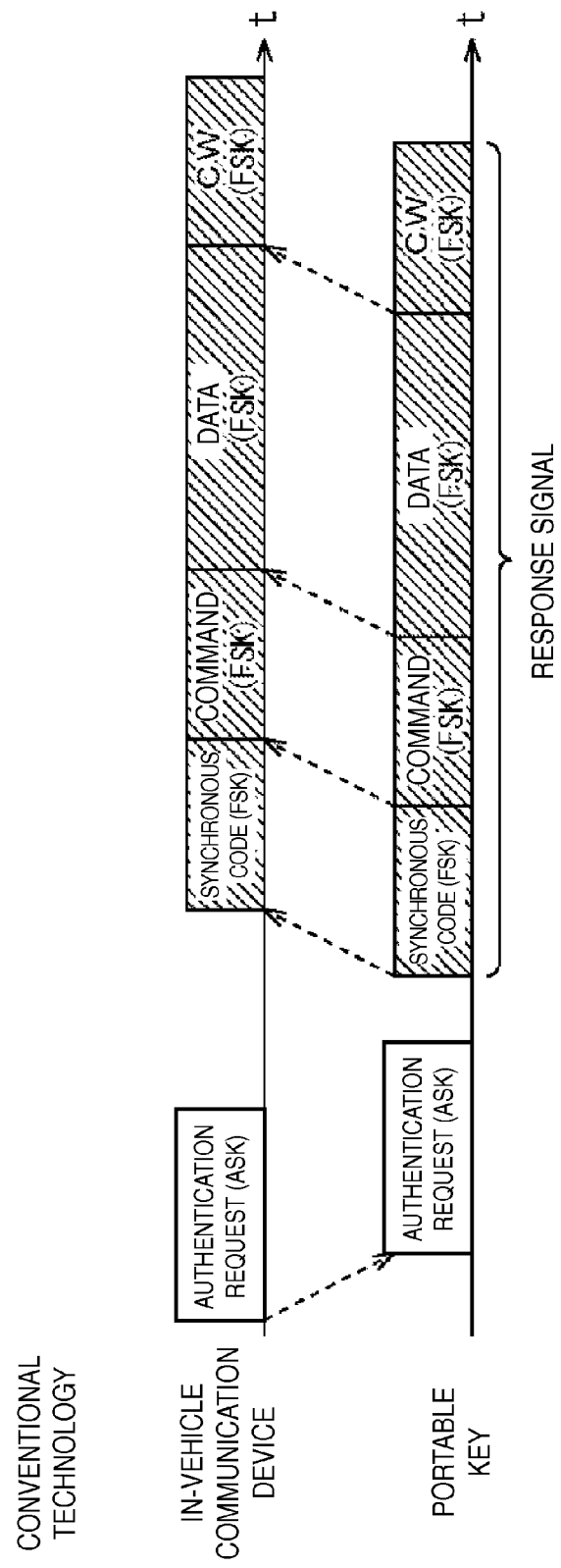
FIG. 5 is a timing chart illustrating the signal flow of a conventional communication system.

Conventionally, as illustrated in FIG. 5, the modulation method of the response signal is fixed to the FSK modulation method. On the other hand, in the communication system 101, as illustrated in FIG. 3, the modulation method is changed in the middle of the response signal, and the demodulation method of the response signal is changed in association with the change of the modulation method. In addition, it is difficult for the repeater 103 detect and follow the change of the modulation method during the repeat of the response signal. Accordingly, the repeater 103 is more likely to fail in the repeat of the response signal, and therefore the relay attack is difficult to perform.

An IC that easily changes the modulation method or the demodulation method is commercially available, so that the use of the IC can easily construct the in-vehicle communication device 111 and the portable key 112 without complicating the circuit configuration or enlarging the circuit scale.

Because necessity to add the newly-transmitted or -received signal or necessity to add the new information to each signal is eliminated, the processing time is similar to conventional one.

Second Embodiment of Processing of Communication System 101

A second embodiment of processing of the communication system 101 will be described below with reference to FIGS. 6 and 7. In the second embodiment, the response signal is transmitted from the portable key 112 while divided into the authentication signal (first division signal) and the command signal (second division signal).

Figure 6:
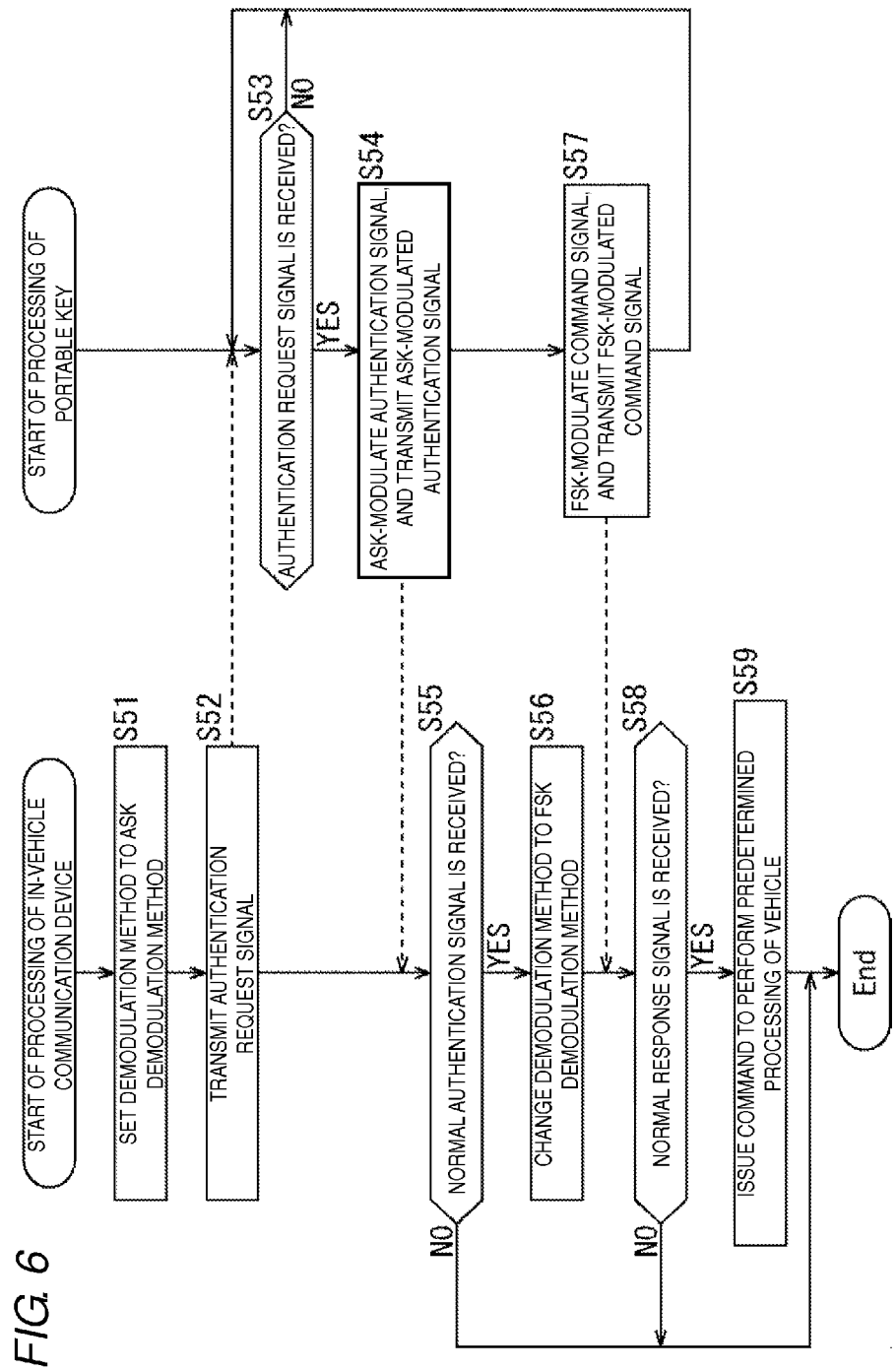
FIG. 6 is a chart illustrating a second embodiment of the processing of the communication system.
Figure 7:
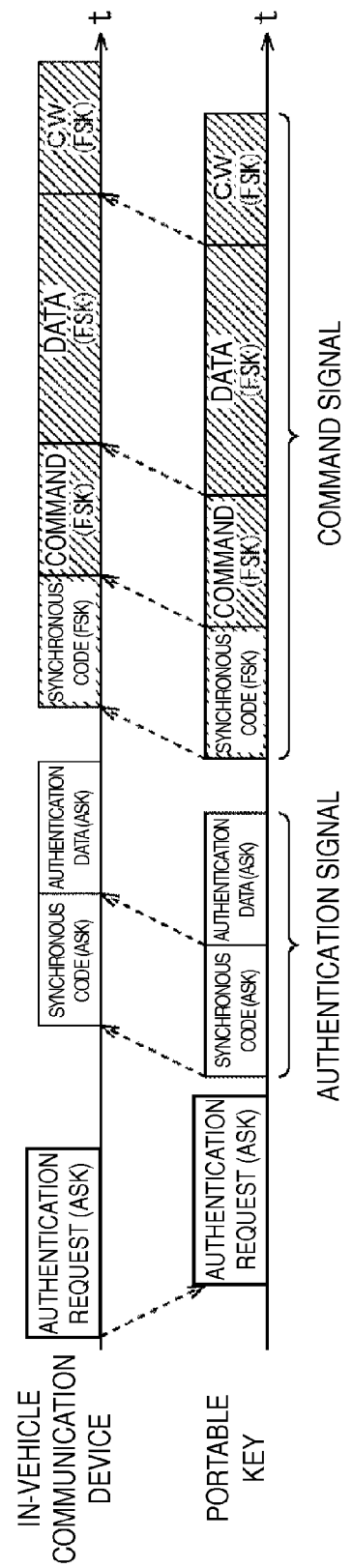
FIG. 7 is a timing chart illustrating the signal flow in the second embodiment of the processing of the communication system.

FIG. 6 is a flowchart illustrating the second embodiment of the processing of the communication system 101, and FIG. 7 is a timing chart illustrating the signal flow of the communication system 101.

In Step S51, similarly to the processing in Step S1 of FIG. 2, the demodulation method of the receiver 122 of the in-vehicle communication device 111 is set to the ASK demodulation method.

In Step S52, similarly to the processing in Step S2 of FIG. 2, the in-vehicle communication device 111 transmits the authentication request signal.

In Step S53, similarly to the processing in Step S3 of FIG. 2, the portable key 112 determines whether the authentication request signal is received. When the authentication request signal is determined to be received, the processing goes to Step S54.

In Step S54, the portable key 112 ASK-modulates the authentication signal, and transmits the ASK-modulated authentication signal. Specifically, the signal processor 152 generates the authentication signal in response to the authentication request signal received from the in-vehicle communication device 111, and supplies the authentication signal to the transmitter 145 through the transmission controller 153.

For example, as illustrated in FIG. 7, the authentication signal is constructed by blocks of the synchronous code portion and an authentication data portion.

The synchronous code portion is the block similar to the synchronous code portion of the response signal in FIG. 3.

The authentication data portion is the block that includes the authentication information on the portable key 112.

Under the control of transmission controller 153, the transmitter 145 ASK-modulates the authentication signal, and transmits the ASK-modulated authentication signal through the antenna 146.

In Step S55, the signal processor 132 of the in-vehicle communication device 111 determines whether the normal authentication signal is received. Specifically, when receiving the authentication signal transmitted from the portable key 112 in the processing of Step S54 through the antenna 121, the receiver 122 of the in-vehicle communication device 111 demodulates the ASK-modulated authentication signal, and supplies the demodulated authentication signal to the signal processor 132 through the reception controller 131. The receiver 122 performs the phase synchronization based on the synchronous code included in the synchronous code portion of the authentication signal. The signal processor 132 collates the authentication information on the portable key 112, which is included in the authentication data portion. When the authentication information is the normal authentication information, the signal processor 132 determines that the normal authentication signal is received, and the processing goes to Step S56.

In Step S56, similarly to the processing in Step S6 of FIG. 2, the demodulation method of the receiver 122 of the in-vehicle communication device 111 is changed to the FSK demodulation method.

In Step S57, the portable key 112 FSK-modulates the command signal, and transmits the FSK-modulated command signal. Specifically, the signal processor 152 generates the command signal in response to the authentication request signal received from the in-vehicle communication device 111, and supplies the command signal to the transmitter 145 through the transmission controller 153.

For example, as illustrated in FIG. 7, the command signal is constructed by blocks of the synchronous code portion, the command portion, and the data portion and CW portion. Although the command signal has the construction similar to the response signal in FIG. 3, the command signal can eliminate part of the data previously transmitted by the authentication signal compared with the response signal in FIG. 3.

Under the control of transmission controller 153, the transmitter 145 FSK-modulates the command signal, and transmits the FSK-modulated command signal through the antenna 146. A predetermined interval is provided until the transmission of the command signal is started since the transmission of the authentication signal is ended.

Therefore, as illustrated in FIG. 7, the modulation method is switched in the middle of the response signal, more strictly between the authentication signal and command signal, which constitute the response signal.

Then the processing of the portable key 112 returns to Step S53, and the pieces of processing from Step S53 are performed.

In Step S58, the signal processor 132 of the in-vehicle communication device 111 determines whether the normal response signal is received. Specifically, when receiving the command signal transmitted from the portable key 112 in the processing of Step S57 through the antenna 121, the receiver 122 of the in-vehicle communication device 111 demodulates the FSK-modulated command signal, and supplies the demodulated command signal to the signal processor 132 through the reception controller 131. The signal processor 132 collates the authentication information on the portable key 112, which is included in the data portion of the command signal. When the authentication information is the normal authentication information, the signal processor 132 determines that the normal command signal is received, and determines that the normal response signal (that is, a combination of the normal authentication signal and the normal command signal) is received. Then the processing goes to Step S59.

In Step S59, the vehicle controller 134 of the in-vehicle communication device 111 issues the command to perform the predetermined processing of the vehicle 102. Specifically, the signal processor 132 supplies the command included in the command portion of the command signal to the vehicle controller 134. The vehicle controller 134 issues the command to another device such as the ECU (Engine Control Unit) in the vehicle 102 such that the processing corresponding to the acquired command is performed. Therefore, the processing such as the automatic entry function, the push start function, and the welcome lamp lighting function is performed.

Then the in-vehicle communication device 111 ends the processing.

On the other hand, when failing to receive the command signal in Step S58, or when failing to authenticate the command signal in Step S58, the signal processor 132 determines that the normal response signal is not received. Then the processing of the in-vehicle communication device 111 is ended.

When failing to receive the authentication signal in Step S55, or when failing to authenticate the authentication signal in Step S55, the signal processor 132 determines that the normal authentication signal is not received. Then the processing of the in-vehicle communication device 111 is ended.

For the prior authentication system, for example, when the normal authentication signal is determined to be not received in Step S55, when the normal response signal is determined to be not received in Step S58, or when the processing in Step S59 is ended, the processing of the in-vehicle communication device 111 returns to Step S51, and the pieces of processing from Step S51 are performed.

As described above, in the second embodiment, the response signal is divided into the authentication signal and the command signal, and the modulation method is switched between the response signal and the command signal, so that the switching between the modulation method of the portable key 112 and the demodulation method of the in-vehicle communication device 111 can surely be synchronized.

Third Embodiment of Processing of Communication System 101

A third embodiment of processing of the communication system 101 will be described below with reference to FIGS. 8 and 9. In the third embodiment, the response signal is transmitted from the portable key 112 while divided into the authentication signal and the command signal, and a change position of the modulation method of the command-signal is variable.

Figure 8:
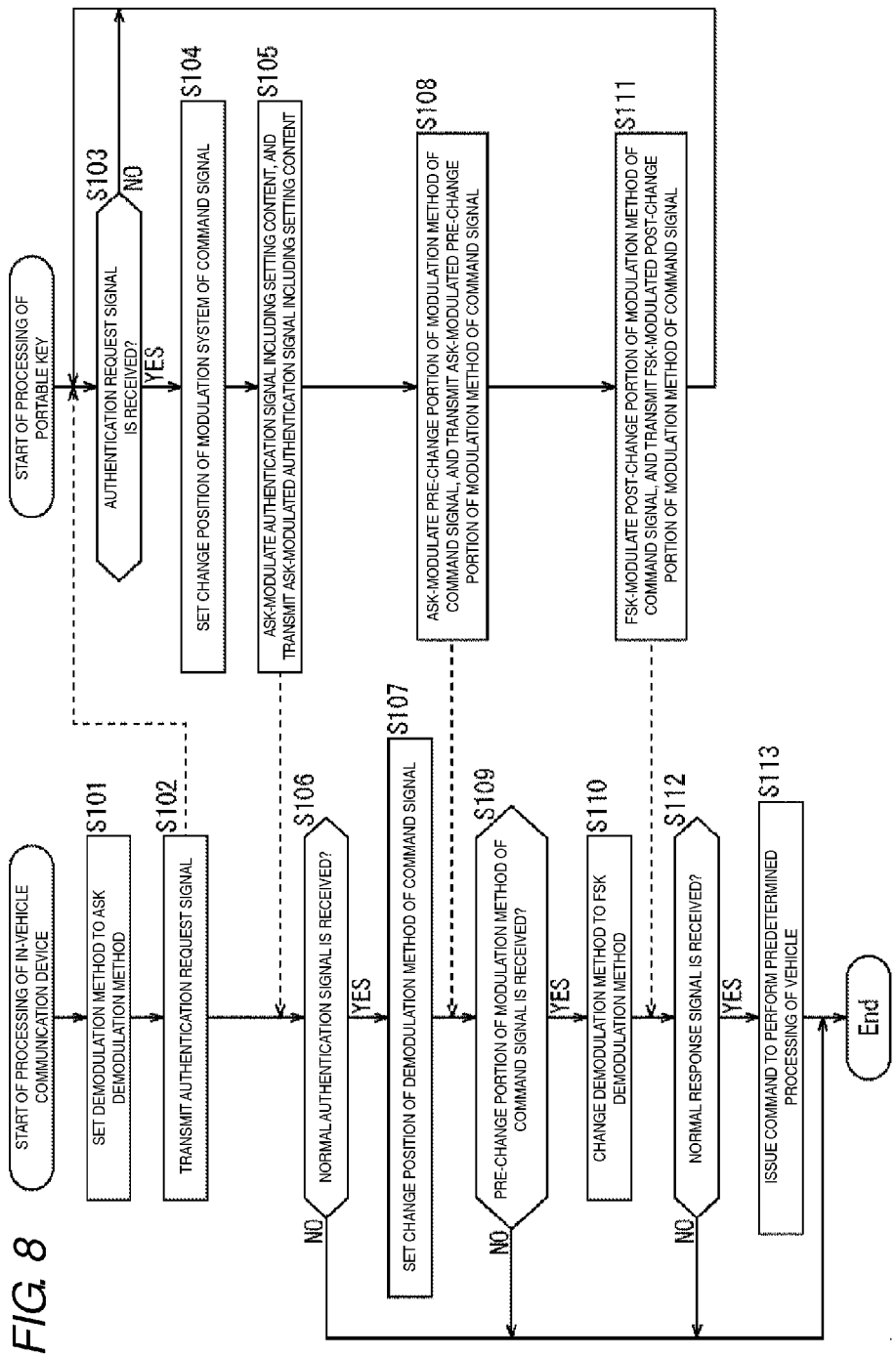
FIG. 8 is a chart illustrating a third embodiment of the processing of the communication system.
Figure 9:
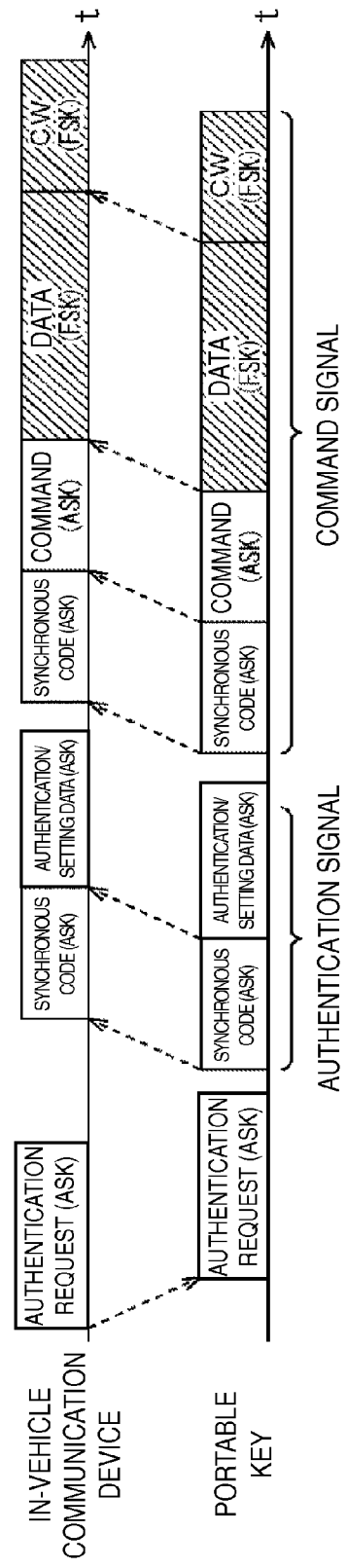
FIG. 9 is a timing chart illustrating the signal flow in the third embodiment of the processing of the communication system.

FIG. 8 is a flowchart illustrating the third embodiment of the processing of the communication system 101, and FIG. 9 is a timing chart illustrating the signal flow of the communication system 101.

In Step S101, similarly to the processing in Step S1 of FIG. 2, the demodulation method of the receiver 122 of the in-vehicle communication device 111 is set to the ASK demodulation method.

In Step S102, similarly to the processing in Step S2 of FIG. 2, the in-vehicle communication device 111 transmits the authentication request signal.

In Step S103, similarly to the processing in Step S3 of FIG. 2, the portable key 112 determines whether the authentication request signal is received. When the authentication request signal is determined to be received, the processing goes to Step S104.

In Step S104, the signal processor 152 of the portable key 112 sets the change position of the modulation method of the command signal. Specifically, the signal processor 152 sets from which block of the synchronous code portion to CW portion of the command signal the modulation method is to be changed to the FSK modulation method.

For example, the change position of the modulation method may randomly be set, or set according to a predetermined rule.

In Step S105, the portable key 112 ASK-modulates the authentication signal including a setting contents, and transmits the ASK-modulated authentication signal. Specifically, the signal processor 152 generates the authentication signal in response to the authentication request signal received from the in-vehicle communication device 111, and supplies the authentication signal to the transmitter 145 through the transmission controller 153.

For example, as illustrated in FIG. 9, the authentication signal is constructed by blocks of the synchronous code portion and an authentication/setting data portion.

The synchronous code portion is the block similar to the synchronous code portion of the response signal in FIG. 3.

The authentication/setting data portion is the block that includes the authentication information on the portable key 112 and setting information on the change position of the modulation method of the command signal.

Under the control of transmission controller 153, the transmitter 145 ASK-modulates the authentication signal, and transmits the ASK-modulated authentication signal through the antenna 146. Therefore, the in-vehicle communication device 111 is notified of the change position of the modulation method of the command signal using the authentication signal.

In Step S106, similarly to the processing in Step S55 of FIG. 6, the in-vehicle communication device 111 determines whether the normal authentication signal is received. When the normal authentication signal is determined to be received, the processing goes to Step S107.

In Step S107, the in-vehicle communication device 111 sets the change position of the demodulation method of the command signal. Specifically, the signal processor 132 notifies the reception controller 131 of the change position of the modulation method of the command signal, which is indicated by the authentication/setting data portion of the authentication signal. The reception controller 131 stores the notified change position as the change position of the demodulation method of the command signal.

In Step S108, the portable key 112 ASK-modulates the pre-change portion of the modulation method of the command signal, and transmits the ASK-modulated pre-change portion. Specifically, the signal processor 152 generates the command signal having the construction similar to the command signal in FIG. 7 in response to the authentication request signal received from the in-vehicle communication device 111, and supplies the command signal to the transmitter 145 through the transmission controller 153. The signal processor 152 notifies the transmission controller 153 of the set change position of the modulation method of the command signal.

Under the control of transmission controller 153, the transmitter 145 ASK-modulates the pre-change portion of the modulation method of the command signal, and transmits the ASK-modulated pre-change portion through the antenna 146. The predetermined interval is provided until the transmission of the command signal is started since the transmission of the authentication signal is ended.

FIG. 9 illustrates an example when the change position of the modulation method of the command signal is set to the data portion. In this case, the transmitter 145 ASK-modulates the synchronous code portion and command portion preceding the data portion, which is of the change position of the modulation method, and transmits the ASK-modulated synchronous code portion and command portion through the antenna 146.

The processing in the case that the change position of the modulation method of the command signal is set to the data portion as illustrated in FIG. 9 will be described below.

In Step S109, the signal processor 132 of the in-vehicle communication device 111 determines whether the pre-change portion of the modulation method of the command signal is received. Specifically, when receiving the synchronous code portion and command portion of the command signal transmitted from the portable key 112 in the processing of Step S108 through the antenna 121, the receiver 122 demodulates the ASK-modulated synchronous code portion and command portion, and supplies the demodulated synchronous code portion and command portion to the signal processor 132 through the reception controller 131. The receiver 122 performs the phase synchronization based on the synchronous code included in the synchronous code portion. When the above processing is performed within the determination time since the authentication signal is received, the signal processor 132 determines that the pre-change portion of the modulation method of the command signal is received. Then the processing goes to Step S110.

In Step S110, similarly to the processing in Step S6 of FIG. 2, the demodulation method of the receiver 122 of the in-vehicle communication device 111 is changed to the FSK demodulation method.

In Step S111, the portable key 112 FSK-modulates the post-change portion of the modulation method of the command signal, and transmits the FSK-modulated post-change portion. Specifically, under the control of the transmission controller 153, the transmitter 145 FSK-modulates the data portion and CW portion, which are of the post-change portion of the modulation method of the command signal, and transmits the FSK-modulated data portion and CW portion through the antenna 146.

Therefore, as illustrated in FIG. 9, the modulation method is switched in the middle of the response signal, more strictly in the middle of the command signal constituting the response signal.

Then the processing of the portable key 112 returns to Step S103, and the pieces of processing from Step S103 are performed.

In Step S112, the signal processor 132 of the in-vehicle communication device 111 determines whether the normal response signal is received. Specifically, when receiving the data portion and CW portion of the command signal transmitted from the portable key 112 in the processing of Step S111 through the antenna 121, the receiver 122 of the in-vehicle communication device 111 demodulates the FSK-modulated data portion and CW portion, and supplies the demodulated data portion and CW portion to the signal processor 132 through the reception controller 131. The signal processor 132 collates the authentication information on the portable key 112, which is included in the data portion of the command signal. When the authentication information is the normal authentication information, the signal processor 132 determines that the normal command signal is received, and determines that the normal response signal (that is, the combination of the normal authentication signal and the normal command signal) is received. Then the processing goes to Step S113.

In Step S113, similarly to the processing in Step S59 of FIG. 6, the in-vehicle communication device 111 issues the command to perform the predetermined processing of the vehicle 102.

Then the in-vehicle communication device 111 ends the processing.

On the other hand, when failing to receive the data portion and CW portion of the command signal in Step S112, or when failing to authenticate the command signal in Step S112, the signal processor 132 determines that the normal response signal is not received. Then the processing of the in-vehicle communication device 111 is ended.

When failing to receive the synchronous code portion and command portion of the command signal in Step S109, the signal processor 132 determines that the pre-change portion of the modulation method of the command signal is not received. Then the processing of the in-vehicle communication device 111 is ended.

When failing to receive the authentication signal in Step S106, or when failing to authenticate the authentication signal in Step S106, the signal processor 132 determines that the normal authentication signal is not received. Then the processing of the in-vehicle communication device 111 is ended.

For the prior authentication system, for example, when the normal authentication signal is determined to be not received in Step S106, when the pre-change portion of the modulation method of the command signal is determined to be not received in Step S109, when the normal response signal is determined to be not received in Step S112, or when the processing in Step S113 is ended, the processing of the in-vehicle communication device 111 returns to Step S101, and the pieces of processing from Step S101 are performed.

For example, when the change position of the modulation method of the command signal is set to the head synchronous code portion, the pieces of processing in Steps S108 and S109 are eliminated.

As described above, in the third embodiment, because the change position of the modulation method of the command signal varies in each communication, the relay attack may be difficult to perform.

Fourth Embodiment of Processing of Communication System 101

A fourth embodiment of processing of the communication system 101 will be described below with reference to FIGS. 10 and 11. In the fourth embodiment, the response signal is transmitted from the portable key 112 while divided into the authentication signal and the command signal, and the combination of the modulation methods of the command signal is variable. Accordingly, the fourth embodiment can be applied to the case that the portable key 112 is compatible with at least three kinds of modulation methods.

Figure 10:
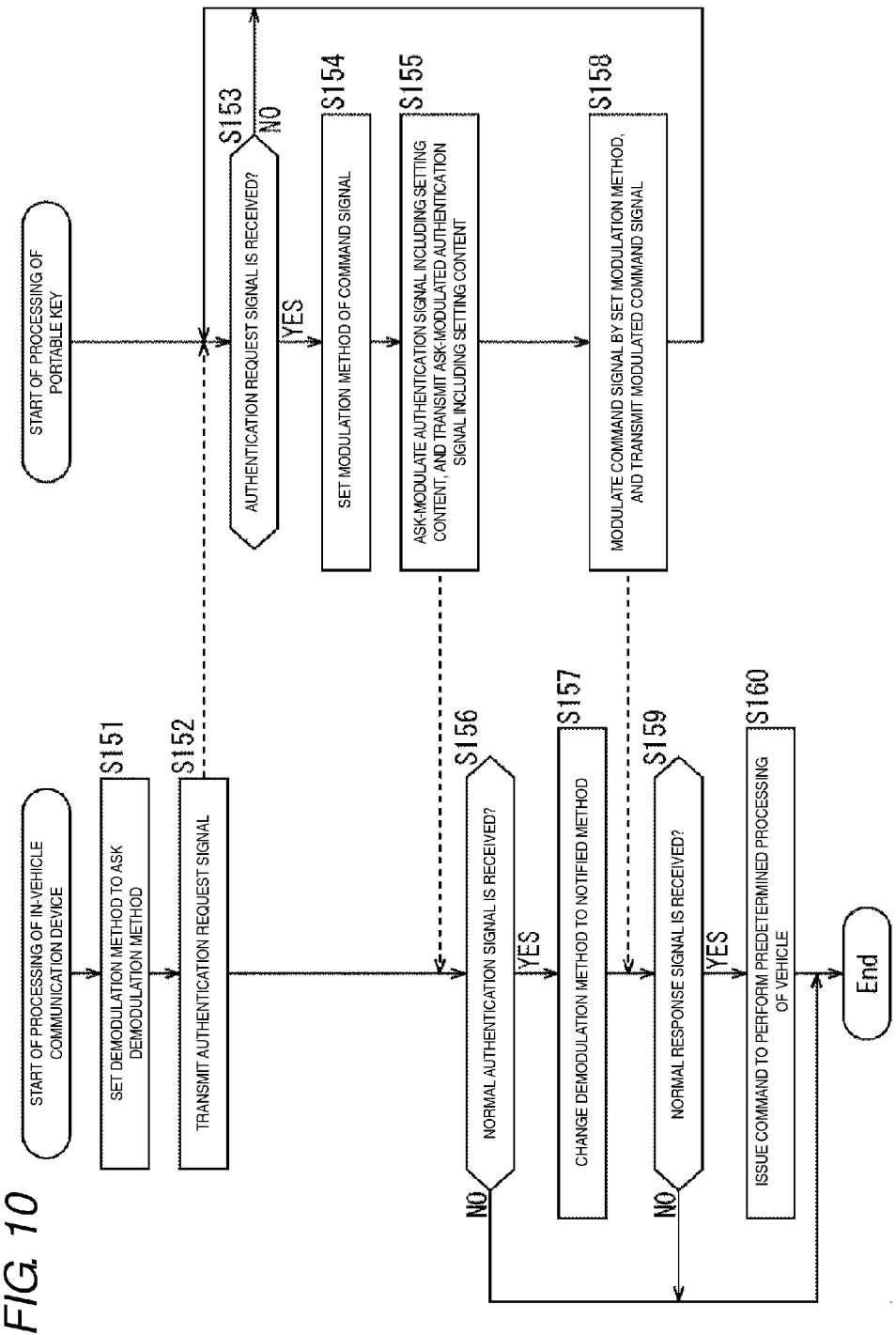
FIG. 10 is a chart illustrating a fourth embodiment of the processing of the communication system.
Figure 11:
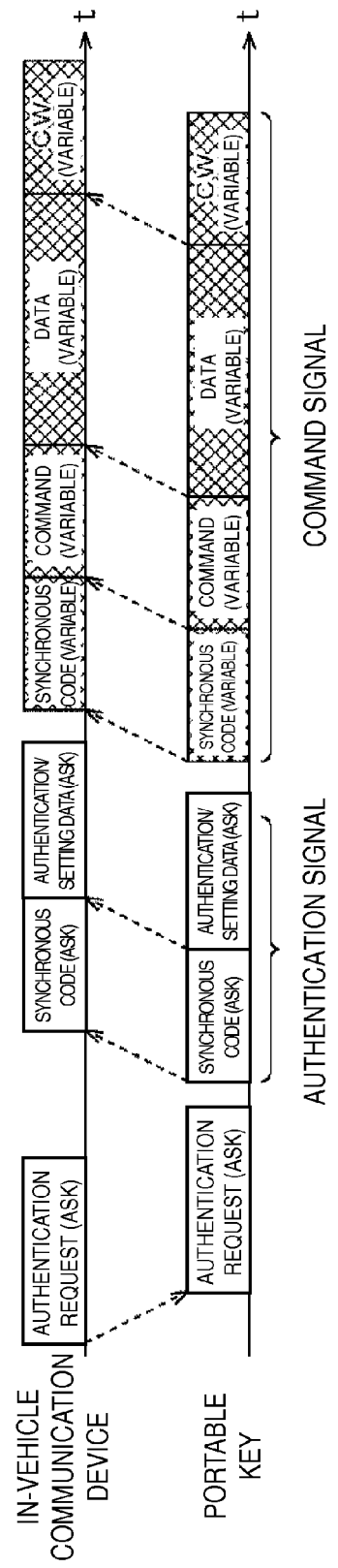
FIG. 11 is a timing chart illustrating the signal flow in the fourth embodiment of the processing of the communication system.

FIG. 10 is a flowchart illustrating the fourth embodiment of the processing of the communication system 101, and FIG. 11 is a timing chart illustrating the signal flow of the communication system 101.

In Step S151, similarly to the processing in Step S1 of FIG. 2, the demodulation method of the receiver 122 of the in-vehicle communication device 111 is set to the ASK demodulation method.

In Step S152, similarly to the processing in Step S2 of FIG. 2, the in-vehicle communication device 111 transmits the authentication request signal.

In Step S153, similarly to the processing in Step S3 of FIG. 2, the portable key 112 determines whether the authentication request signal is received. When the authentication request signal is determined to be received, the processing goes to Step S154.

In Step S154, the signal processor 152 of the portable key 112 sets the modulation method of the command signal. Specifically, the signal processor 152 select any modulation method except the ASK modulation method from the modulation methods with which the transmitter 145 is compatible, and sets the selected modulation method to the modulation method of the command signal.

For example, the modulation method of the command signal may randomly be set, or set according to a predetermined rule.

In Step S155, the portable key 112 ASK-modulates the authentication signal including the setting contents, and transmits the ASK-modulated authentication signal. Specifically, the signal processor 152 generates the authentication signal in response to the authentication request signal received from the in-vehicle communication device 111, and supplies the authentication signal to the transmitter 145 through the transmission controller 153.

For example, as illustrated in FIG. 11, the authentication signal is constructed by blocks of the synchronous code portion and the authentication/setting data portion.

The synchronous code portion is the block similar to the synchronous code portion of the response signal in FIG. 3.

The authentication/setting data portion is the block that includes the authentication information on the portable key 112 and the setting information on the modulation method of the command signal.

Under the control of transmission controller 153, the transmitter 145 ASK-modulates the authentication signal, and transmits the ASK-modulated authentication signal through the antenna 146. Therefore, the in-vehicle communication device 111 is notified of the modulation method of the command signal using the authentication signal.

In Step S156, similarly to the processing in Step S55 of FIG. 6, the in-vehicle communication device 111 determines whether the normal authentication signal is received. When the normal authentication signal is determined to be received, the processing goes to Step S157.

In Step S157, the in-vehicle communication device 111 changes the demodulation method of the command signal to the notified method. Specifically, the signal processor 132 notifies the reception controller 131 of the modulation method of the command signal, which is indicated by the authentication/setting data portion of the authentication signal. The reception controller 131 changes the demodulation method of the receiver 122 to the demodulation method corresponding to the notified modulation method.

In Step S158, the portable key 112 modulates the command signal by the set modulation method, and transmits the modulated command signal. Specifically, the signal processor 152 generates the command signal having the construction similar to the command signal in FIG. 7 in response to the authentication request signal received from the in-vehicle communication device 111, and supplies the command signal to the transmitter 145 through the transmission controller 153. The signal processor 152 notifies the transmission controller 153 of the set modulation method of the command signal.

Under the control of transmission controller 153, the transmitter 145 modulates the command signal by the set modulation method, and transmits the modulated command signal through the antenna 146. The predetermined interval is provided until the transmission of the command signal is started since the transmission of the authentication signal is ended.

Therefore, as illustrated in FIG. 11, the modulation method is switched in the middle of the response signal, more strictly between the authentication signal and command signal, which constitute the response signal.

Then the processing of the portable key 112 returns to Step S153, and the pieces of processing from Step S153 are performed.

In Step S159, similarly to the processing in Step S58 of FIG. 6, the in-vehicle communication device 111 determines whether the normal response signal is received. When the normal response signal is determined to be received, the processing goes to Step S160.

In Step S160, similarly to the processing in Step S59 of FIG. 6, the in-vehicle communication device 111 issues the command to perform the predetermined processing of the vehicle 102.

Then the in-vehicle communication device 111 ends the processing.

On the other hand, when the normal authentication signal is determined to be not received in Step S156, or when the normal response signal is determined to be not received in Step S159, the processing of the in-vehicle communication device 111 is ended.

For the prior authentication system, for example, when the normal authentication signal is determined to be not received in Step S156, when the normal response signal is determined to be not received in Step S159, or when the processing in Step S160 is ended, the processing of the in-vehicle communication device 111 returns to Step S151, and the pieces of processing from Step S151 are performed.

As described above, in the fourth embodiment, because the modulation method of the command signal varies in each communication, the relay attack may be difficult to perform.

Fifth Embodiment of Processing of Communication System 101

A fifth embodiment of processing of the communication system 101 will be described below with reference to FIGS. 12 and 13. In the fifth embodiment, the third and fourth embodiments are combined.

Figure 12:
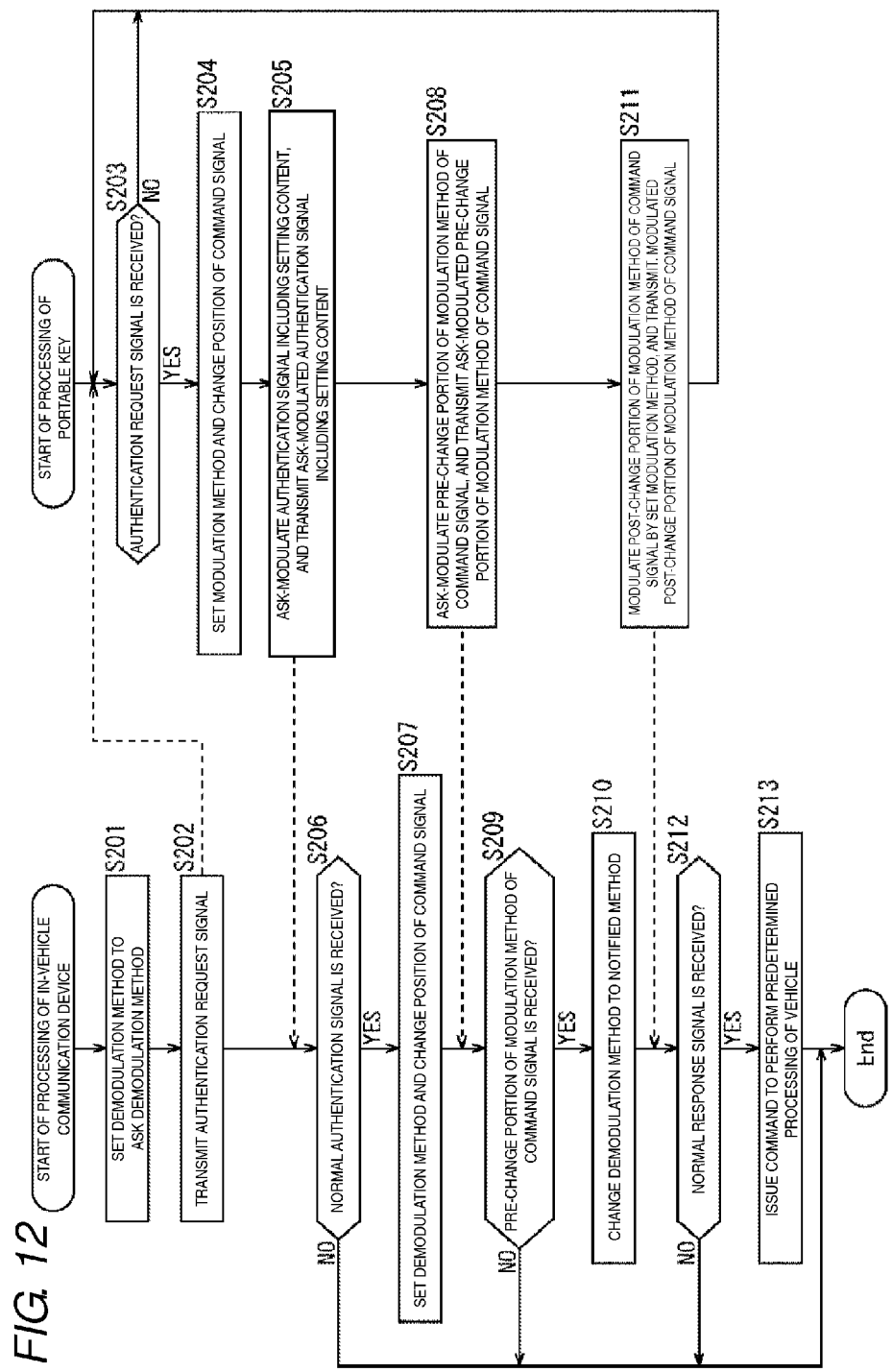
FIG. 12 is a chart illustrating a fifth embodiment of the processing of the communication system.
Figure 13:
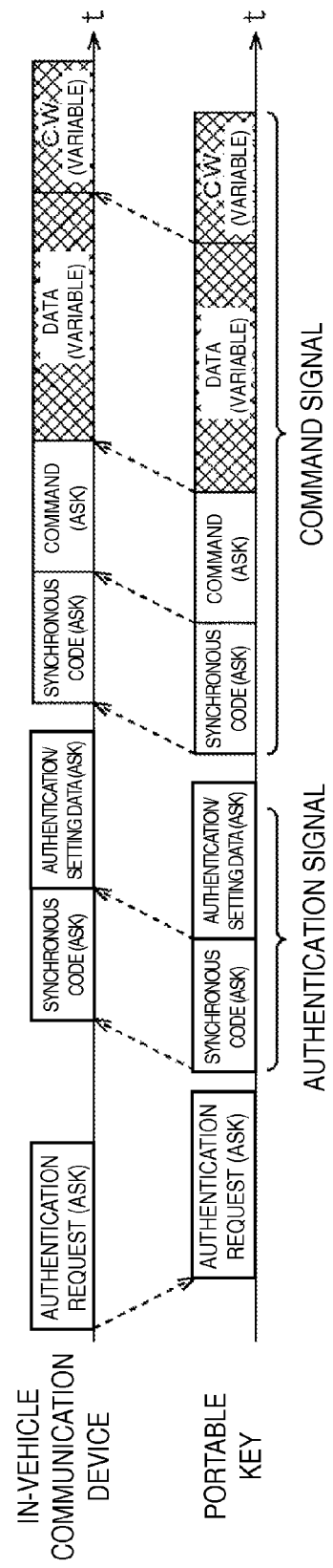
FIG. 13 is a timing chart illustrating the signal flow in the fifth embodiment of the processing of the communication system.

FIG. 12 is a flowchart illustrating the fifth embodiment of the processing of the communication system 101, and FIG. 13 is a timing chart illustrating the signal flow of the communication system 101.

In Step S201, similarly to the processing in Step S1 of FIG. 2, the demodulation method of the receiver 122 of the in-vehicle communication device 111 is set to the ASK demodulation method.

In Step S202, similarly to the processing in Step S2 of FIG. 2, the in-vehicle communication device 111 transmits the authentication request signal.

In Step S203, similarly to the processing in Step S3 of FIG. 2, the portable key 112 determines whether the authentication request signal is received. When the authentication request signal is determined to be received, the processing goes to Step S204.

In Step S204, the signal processor 152 of the portable key 112 sets the modulation method and change position of the command signal. Specifically, similarly to the processing in Step S154 of FIG. 10, the signal processor 152 sets the modulation method of the command signal. Similarly to the processing in Step S104 of FIG. 8, the signal processor 152 sets the change position of the modulation method of the command signal.

In Step S205, the portable key 112 ASK-modulates the authentication signal including the setting contents, and transmits the ASK-modulated authentication signal. Specifically, the signal processor 152 generates the authentication signal in response to the authentication request signal received from the in-vehicle communication device 111, and supplies the authentication signal to the transmitter 145 through the transmission controller 153.

For example, as illustrated in FIG. 13, the authentication signal is constructed by blocks of the synchronous code portion and an authentication/setting data portion.

The synchronous code portion is the block similar to the synchronous code portion of the response signal in FIG. 3.

The authentication/setting data portion is the block that includes the authentication information on the portable key 112 and the setting information on the modulation method and change position of the command signal.

Under the control of transmission controller 153, the transmitter 145 ASK-modulates the authentication signal, and transmits the ASK-modulated authentication signal through the antenna 146. Therefore, the in-vehicle communication device 111 is notified of the modulation method and change position of the command signal using the authentication signal.

In Step S206, similarly to the processing in Step S55 of FIG. 6, the in-vehicle communication device 111 determines whether the normal authentication signal is received. When the normal authentication signal is determined to be received, the processing goes to Step S207.

In Step S207, the in-vehicle communication device 111 sets the demodulation method and change position of the command signal. Specifically, the signal processor 132 notifies the reception controller 131 of the modulation method and change position of the command signal, which are indicated by the authentication/setting data portion of the authentication signal. The reception controller 131 stores the demodulation method corresponding to the notified modulation method as the post-change demodulation method of the command signal. The reception controller 131 stores the notified change position as the change position of the demodulation method of the command signal.

In Step S208, the portable key 112 ASK-modulates the pre-change portion of the modulation method of the command signal, and transmits the ASK-modulated pre-change portion. Specifically, the signal processor 152 generates the command signal having the construction similar to the command signal in FIG. 7 in response to the authentication request signal received from the in-vehicle communication device 111, and supplies the command signal to the transmitter 145 through the transmission controller 153. The signal processor 152 notifies the transmission controller 153 of the set change position of the modulation method of the command signal and of the post-change modulation method.

Under the control of transmission controller 153, the transmitter 145 ASK-modulates the pre-change portion of the modulation method of the command signal, and transmits the ASK-modulated pre-change portion through the antenna 146. The predetermined interval is provided until the transmission of the command signal is started since the transmission of the authentication signal is ended.

FIG. 13 illustrates an example when the change position of the modulation method of the command signal is set to the data portion. In this case, the transmitter 145 ASK-modulates the synchronous code portion and command portion preceding the data portion, which is of the change position of the modulation method, and transmits the ASK-modulated synchronous code portion and command portion through the antenna 146.

The processing in the case that the change position of the modulation method of the command signal is set to the data portion as illustrated in FIG. 13 will be described below.

In Step S209, similarly to the processing in Step S109 of FIG. 8, the in-vehicle communication device 111 determines whether the pre-change portion of the modulation method of the command signal is received. When the pre-change portion of the modulation method of the command signal is determined to be received, the processing goes to Step S210.

In Step S210, the reception controller 131 of the in-vehicle communication device 111 changes the demodulation method of the receiver 122 to the notified method (more strictly the demodulation method corresponding to the notified modulation method).

In Step S211, the post-change portion of the modulation method of the command signal is modulated by the set modulation method, and the modulated post-change portion is transmitted. Specifically, under the control of the transmission controller 153, the transmitter 145 modulates the data portion and CW portion, which are of the post-change portion of the modulation method of the command signal, by the set modulation method, and transmits the modulated data portion and CW portion through the antenna 146.

Therefore, as illustrated in FIG. 13, the modulation method is switched in the middle of the response signal, more strictly in the middle of the command signal constituting the response signal.

Then the processing of the portable key 112 returns to Step S203, and the pieces of processing from Step S203 are performed.

In Step S212, similarly to the processing in Step S112 of FIG. 8, the in-vehicle communication device 111 determines whether the normal response signal is received. When the normal response signal is determined to be received, the processing goes to Step S213.

In Step S213, similarly to the processing in Step S59 of FIG. 6, the in-vehicle communication device 111 issues the command to perform the predetermined processing of the vehicle 102.

Then the in-vehicle communication device 111 ends the processing.

On the other hand, when the normal authentication signal is determined to be not received in Step S206, when the pre-change portion of the modulation method of the command signal is determined to be not received in Step S209, or when the normal response signal is determined to be not received in Step S212, the processing of the in-vehicle communication device 111 is ended.

For the prior authentication system, for example, when the normal authentication signal is determined to be not received in Step S206, when the pre-change portion of the modulation method of the command signal is determined to be not received in Step S209, when the normal response signal is determined to be not received in Step S212, or when the processing in Step S213 is ended, the processing of the in-vehicle communication device 111 returns to Step S201, and the pieces of processing from Step S201 are performed.

As described above, in the fifth embodiment, because the modulation method and change position of the command signal vary in each communication, the relay attack may be difficult to perform.

2. Modifications

Modifications of the embodiments of the present invention will be described below.

First Modification

Modification Related to Modulation Method and Demodulation Method

The combination and order of the modulation method and demodulation method are described above by way of example, and can arbitrarily be changed. For example, the order of the ASK modulation method and FSK modulation method may be changed, or other modulation method may be adopted.

In the first embodiment, by way of example, the modulation method of the response signal is changed only once. Alternatively, the modulation method of the response signal may be changed at least twice. Similarly, in the third and fifth embodiments, the modulation method of the command signal may be changed at least twice. In the case that the modulation method is changed at least twice, two kinds of modulation methods can alternately be switched, and the modulation methods can be switched in at least three kinds of modulation methods.

In the second to fifth embodiments, by way of example, the response signal is transmitted while divided into the authentication signal and the command signal. Alternatively, the response signal may be transmitted while divided into at least three signals. In the case that the response signal is transmitted while divided into at least three signals, the kind and change position of the modulation method of the third signal or later can be varied similarly to the command signal.

In the first, and third to fifth embodiments, by way of example, the modulation method is changed in block units of the response signal or command signal. The modulation method is not necessarily changed at a boundary of the blocks adjacent to each other, but the modulation method may be changed in the middle of the block. For example, the modulation method may be changed in the middle of the synchronous code portion, or a dummy signal may be added to the head or tail end of the command portion to change the modulation method in the middle of the dummy signal.

In the above embodiments, the modulation method of the response signal transmitted from the portable key 112 to the in-vehicle communication device 111 is changed by way of example. The modulation method of the authentication request signal transmitted from the in-vehicle communication device 111 to the portable key 112 may be changed by the similar method. In this case, the relay attack may be difficult to perform, similar to the case that the modulation method of the response signal is changed.

Second Modification

Modification Related to Device Configuration

The configuration of the in-vehicle communication device 111 is not limited to the example in FIG. 1, but the configuration of the in-vehicle communication device 111 can be changed in various ways. For example, the reception controller 131 or the transmission controller 133 may be provided outside the controller 123, and the receiver 122 or the transmitter 124 may be provided in the controller 123. For example, the receiver 122 and the reception controller 131 may be combined, and the transmitter 124 and the transmission controller 133 may be combined. For example, the receiver 122 and the transmitter 124 may be combined. In the in-vehicle communication device 111, the portion in which the transmission processing is performed and the portion in which the reception processing is performed may be divided into two devices.

The configuration of the portable key 112 is not limited to the example in FIG. 1, but the configuration of the portable key 112 can be changed in various ways. For example, the reception controller 151 or the transmission controller 153 may be provided outside the controller 144, and the receiver 142 or the transmitter 145 may be provided in the controller 144. For example, the receiver 142 and the reception controller 151 may be combined, and the transmitter 145 and the transmission controller 153 may be combined. For example, the receiver 142 and the transmitter 145 may be combined.

The number of portable keys 112 is not limited to one, but at least two portable keys 112 may be provided. The number of in-vehicle communication devices 111 is not limited to one, but at least two in-vehicle communication devices 111 may be provided.

Third Modification

Other Modifications

There is no particular limitation to the kind of the vehicle to which one or more embodiments of the present invention is applied. For example, one or more embodiments of the present invention can be applied to not only four-wheel vehicles such as an automobile but also other kinds of vehicles such as a two-wheel vehicle.

One or more embodiments of the present invention can also be applied to the wireless communication system except the vehicle. For example, one or more embodiments of the present invention can effectively be applied to a system in which one of the communication devices automatically transmits the response signal in response to the request from the other communication device. For example, one or more embodiments of the present invention is effectively applied to the system in which the authentication request signal is transmitted to the portable key from the communication device provided in a building when a door of the building is operated, and the door is locked or unlocked in response to the response signal from the portable key.

[Configuration Example of Computer]

The series of pieces of processing can be performed by hardware or software. In the case that the series of pieces of processing are performed by the software, a program constituting the software is installed in the computer. Examples of the computer include a computer incorporated in the dedicated hardware and a general-purpose personal computer in which various programs are installed to be able to perform various functions.

For example, the program executed by the computer can be provided while recorded in a removable medium as a package medium. The program can also be provided through wireless or wired transmission medium such as a local area network, the Internet, and a digital satellite broadcasting.

For example, the program can previously be installed in the ROM or storage part.

The program may be executed by the computer in time series along the procedure of one or more of the embodiments, concurrently executed by the computer, or executed by the computer in necessary timing such as calling.

As used herein, the system means a set of a plurality of structural elements (such as the device and a module (component)) whether all the structural elements exist in a chassis or not. Accordingly, both a plurality of devices accommodated in individual chassis while connected to each other through a network and one device in which a plurality of modules are accommodated in one chassis are the system.

The present invention is not limited to the above embodiments, but various changes can be made without departing from the scope of the present invention.

Each step described in the flowcharts can be performed by one device, or the step can be performed while shared by a plurality of devices.

In the case that a plurality of pieces of processing are included in one step, the plurality of pieces of processing included in the one step can be performed by one device, or the plurality of pieces of processing included in the one step can be performed by the plurality of devices while shared by the plurality of devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A communication system comprising:
a first communication device; and
a second communication device that conducts wireless communication with the first communication device,
wherein the first communication device comprises:
a first transmitter that, while modulating a first signal, transmits the modulated first signal to the second communication device, and
a first transmission controller that controls the first transmitter,
wherein the second communication device comprises a first receiver that receives the modulated first signal from the first communication device and demodulates the received modulated first signal,
wherein the first transmission controller performs control that changes a modulation method in midstream as the first signal is being modulated and transmitted,
wherein the first receiver changes a demodulation method according to the change of the modulation method of the first signal in midstream when the modulated first signal is received and demodulated,
wherein the first transmission controller performs control such that the modulation method is changed in a previously-set predetermined position of the first signal,
wherein the first receiver changes the demodulation method in the previously-set predetermined position of the first signal, and
wherein one of the first communication device and the second communication device is disposed in a vehicle key fob, and the other of the first communication device and the second communication device is disposed in an in-vehicle communication device.

2. The communication system according to claim 1,
wherein the first communication device further comprises a second receiver that receives a second signal from the second communication device and demodulates the received second signal,
wherein the second communication device is provided in a vehicle,
wherein the second communication device further comprises:
  a second transmitter that, while modulating the second signal, transmits the modulated second signal to the first communication device,
  a second transmission controller that controls the second transmitter, and
  a vehicle controller that controls processing of the vehicle,
wherein the second transmission controller performs control such that the second signal is transmitted when a predetermined operation is performed to the vehicle, or such that the second signal is periodically transmitted,
wherein the first transmission controller performs control such that the first signal is transmitted in response to the second signal, and
wherein the vehicle controller issues a command to perform predetermined processing of the vehicle when the first signal, that is normal, is received from the first communication device.

3. The communication system according to claim 1,
wherein the first communication device is provided in a vehicle,
wherein the first communication device further includes: a second receiver that receives a second signal from the second communication device and demodulates the received second signal; and
wherein a vehicle controller that controls processing of the vehicle,
wherein the second communication device further comprises:
  a second transmitter that, while modulating the second signal, transmits the modulated second signal to the first communication device, and
  a second transmission controller that controls the second transmitter,
wherein the first transmission controller performs control such that the first signal is transmitted when a predetermined operation is performed to the vehicle, or such that the first signal is periodically transmitted,
wherein the second transmission controller performs control such that the second signal is transmitted in response to the first signal, and
wherein the vehicle controller issues a command to perform predetermined processing of the vehicle when the second signal, that is normal, is received from the second communication device.

4. The communication system according to claim 1, wherein the first transmission controller performs control such that the first signal is transmitted while divided into at least a first division signal and a second division signal.

5. The communication system according to claim 4,
wherein the first transmission controller performs control such that the first division signal is modulated by a predetermined first modulation method and such that the second division signal is modulated by a predetermined second modulation method different from the first modulation method, and
wherein the first receiver demodulates the first division signal by a first demodulation method corresponding to the first modulation method and demodulates the second division signal by a second demodulation method corresponding to the second modulation method.

6. The communication system according to claim 4,
wherein the first transmission controller performs control such that a change position of the modulation method of the second division signal is set, such that the second communication device is notified of the set change position using the first division signal, and such that the modulation method is changed in the change position of the second division signal, and
wherein the first receiver changes the demodulation method of the second signal in the change position of which the second communication device is notified using the first division signal.

7. The communication system according to claim 4,
wherein the first transmission controller performs control such that a second modulation method different from a predetermined first modulation method is selected from a plurality of modulation methods, such that the second communication device is notified of the selected second modulation method using the first division signal, such that the first division signal is modulated by the first modulation method, and such that the second division signal is modulated by the second modulation method, and
wherein the first receiver demodulates the first division signal by a first demodulation method corresponding to the first modulation method and demodulates the second division signal by a second demodulation method corresponding to the second modulation method of which the second communication device is notified using the first division signal.

8. A communication device that conducts wireless communication with another communication device, comprising:
  a transmitter that, while modulating a signal, transmits the modulated signal to the another communication device; and
  a transmission controller that controls the transmitter,
  wherein the transmission controller performs control that changes a modulation method in midstream when the signal is transmitted while modulated,
  wherein the transmission controller performs control such that the modulation method is changed in a previously-set predetermined position of the signal, and
  wherein the communication device is disposed in a vehicle key fob, and the other of the communication device and another communication device is disposed in an in-vehicle communication device.

9. A communication device that conducts wireless communication with another communication device, comprising:
  a receiver that receives a modulated signal from the another communication device and demodulates the received modulated signal,
  wherein the receiver changes a demodulation method according to a change of a modulation method of the signal when receiving the signal from the another communication device to demodulate the modulated signal,
  wherein the receiver changes the demodulation method in the previously-set predetermined position of the signal, and
  wherein one of the communication device and the another communication device is disposed in a vehicle key fob, and the other of the communication device and the another communication device is constructed by an in-vehicle communication device.

10. The communication system according to claim 2, wherein the first transmission controller performs control such that the first signal is transmitted while divided into at least a first division signal and a second division signal.

11. The communication system according to claim 3, wherein the first transmission controller performs control such that the first signal is transmitted while divided into at least a first division signal and a second division signal.

12. The communication system according to claim 6,
wherein the first transmission controller performs control such that a second modulation method different from a predetermined first modulation method is selected from a plurality of modulation methods, such that the second communication device is notified of the selected second modulation method using the first division signal, such that the first division signal is modulated by the first modulation method, and such that the second division signal is modulated by the second modulation method, and
wherein the first receiver demodulates the first division signal by a first demodulation method corresponding to the first modulation method and demodulates the second division signal by a second demodulation method corresponding to the second modulation method of which the second communication device is notified using the first division signal.

13. The communication system according to claim 2,
wherein the first transmission controller performs control that changes the modulation method in a previously-set predetermined position of the first signal, and
wherein the first receiver changes the demodulation method in the previously-set predetermined position of the first signal.

14. The communication system according to claim 3,
wherein the first transmission controller performs control that changes the modulation method in a previously-set predetermined position of the first signal, and
wherein the first receiver changes the demodulation method in the previously-set predetermined position of the first signal.

\* \* \* \* \*